US007089357B1

(12) United States Patent
Ezra

(10) Patent No.: US 7,089,357 B1
(45) Date of Patent: Aug. 8, 2006

(54) LOCALLY BUFFERED CACHE EXTENSIONS HAVING ASSOCIATED CONTROL PARAMETERS TO DETERMINE USE FOR CACHE ALLOCATION ON SUBSEQUENT REQUESTS

(75) Inventor: Josef Ezra, Ashland, MA (US)

(73) Assignee: EMC Corporation, Hopkinton, MA (US)

( * ) Notice: Subject to any disclaimer, the term of this patent is extended or adjusted under 35 U.S.C. 154(b) by 329 days.

(21) Appl. No.: 10/667,564

(22) Filed: Sep. 22, 2003

(51) Int. Cl.
G06F 12/00 (2006.01)
G06F 13/00 (2006.01)

(52) U.S. Cl. .................. 711/113; 711/162; 711/170; 711/144; 711/145; 714/6

(58) Field of Classification Search ............... 711/113, 711/162, 170, 144, 145; 714/6, 7; 707/202
See application file for complete search history.

(56) References Cited

U.S. PATENT DOCUMENTS

| | | | |
|---|---|---|---|
| 5,768,623 A * | 6/1998 | Judd et al. ............... | 710/37 |
| 6,029,229 A | 2/2000 | Vishlitzky | |
| 6,047,353 A | 4/2000 | Vishlitzky et al. | |
| 6,457,102 B1 | 9/2002 | Lambright et al. | |
| 6,487,635 B1 | 11/2002 | Cohen et al. | |
| 6,530,003 B1 * | 3/2003 | Bakke et al. ............ | 711/162 |
| 6,581,143 B1 * | 6/2003 | Gagne et al. ............ | 711/162 |
| 6,640,285 B1 | 10/2003 | Bopardikar et al. | |
| 6,643,667 B1 * | 11/2003 | Arai et al. ............... | 707/200 |
| 6,654,855 B1 | 11/2003 | Bopardikar et al. | |
| 6,715,039 B1 | 3/2004 | Michael et al. | |
| 6,725,331 B1 | 4/2004 | Kedem | |
| 6,728,836 B1 | 4/2004 | Lambright et al. | |
| 6,742,138 B1 * | 5/2004 | Gagne et al. ............ | 714/6 |
| 6,754,897 B1 | 6/2004 | Ofer et al. | |
| 6,757,790 B1 | 6/2004 | Chalmer et al. | |
| 6,807,619 B1 | 10/2004 | Ezra et al. | |
| 2003/0005234 A1 * | 1/2003 | Sperber et al. .......... | 711/140 |
| 2003/0023808 A1 * | 1/2003 | Bakke et al. ............ | 711/113 |
| 2003/0229764 A1 * | 12/2003 | Ohno et al. ............. | 711/147 |
| 2004/0128456 A1 * | 7/2004 | Kobayashi et al. ...... | 711/162 |

* cited by examiner

Primary Examiner—Hong Kim
(74) Attorney, Agent, or Firm—Daly,Crowley,Mofford & Durkee, LLP

(57) ABSTRACT

A method and apparatus for cache management in a data storage system is presented. A table with tags corresponding to cache slots in a cache memory is provided. A copy of the table is stored in a local buffer in response to a request for allocation of one of the cache slots. The locally buffered table is used to make the requested cache slot allocation. A set of control parameters associated with the locally buffered table is used to determine if the locally buffered table can be re-used for cache slot allocation in response to a subsequent request for cache slot allocation. User-selectable levels are provided to control the degree of locally buffered table re-use. The user-selectable levels determine which values of the control parameters are used.

12 Claims, 8 Drawing Sheets

LOCALLY BUFFERED CACHE EXTENSIONS HAVING ASSOCIATED CONTROL PARAMETERS TO DETERMINE USE FOR CACHE ALLOCATION ON SUBSEQUENT REQUESTS

BACKGROUND

The invention relates generally to caching management operations in data storage systems.

Mass storage systems typically employ a large number of storage devices, such as disk drives, that are accessible by one or more host processors or computers. Since reading and writing to disks is still a relatively slow operation, many data storage systems use a cache memory to speed up the transfer of information to/from the disks. In such systems, the host computers interact with the cache memory on all transfers to and from storage devices. For example, if data is modified by a host computer, the modified data is written to cache memory, and later written back to disk (the latter operation often being referred to "destaging"). In the case of new write data or read misses, a cache slot for storing the data must be selected.

Typically, one or more data structures are maintained to indicate a cache slot ordering preference according to a cache slot replacement algorithm, such as a "Least Recently Used" algorithm, as well as write pending information to protect cached data that has not been destaged yet.

Accessing and updating such data structures can be a time-consuming process, for example, it may require extensive pointer manipulations, causing data storage system performance to suffer.

SUMMARY

In one aspect, the invention provides for methods and apparatus, including computer software products, for cache management in a data storage system. The methods include: providing a table comprising tags corresponding to cache slots in a cache memory; storing a copy of the table in a local buffer in response to a request for allocation of one of the cache slots; using the locally buffered table to make the requested cache slot allocation; and using a set of control parameters associated with the locally buffered table to determine if the locally buffered table can be used for cache slot allocation in response to a subsequent request.

The mechanism thus gives data storage system users greater flexibility by allowing them to choose different levels of local buffer re-use based on usage patterns for caching efficiency.

Other features and advantages of the invention will be apparent from the following detailed description, and from the claims.

BRIEF DESCRIPTION OF THE DRAWINGS

Like reference numerals will be used to represent like elements.

DETAILED DESCRIPTION

Figure 1:
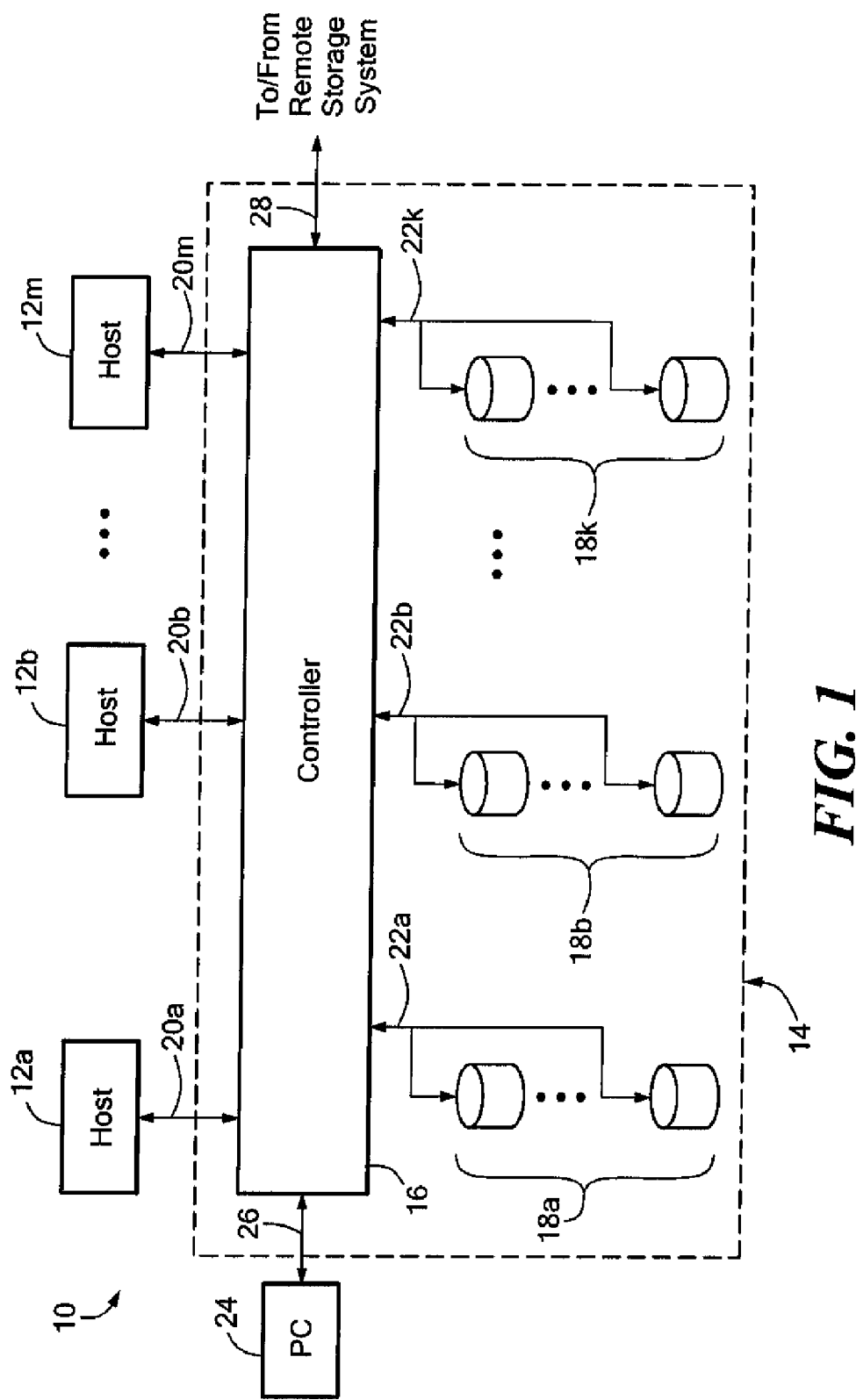
FIG. 1 is a block diagram of a data storage system that includes a storage controller in which the invention can be employed.

Referring to FIG. 1, a data processing system 10 includes a plurality of host computers 12a, 12b, . . . , 12m, connected to a data storage system 14. The data storage system 14 can be, for example, that made by EMC Corporation and known as the Symmetrix® data storage system. The data storage system 14 receives data and commands from, and delivers data and responses to, the host computers 12. The data storage system 14 is a mass storage system having a controller 16 coupled to pluralities of physical storage devices (or, simply, physical devices) shown as physical disks 18a, physical disks 18b, . . . , physical disks 18k. Each of the physical devices 18 is logically divided, in accordance with known techniques, into one or more logical volumes.

The controller 16 interconnects the host computers 12 and the physical devices 18. The controller 16 thus receives memory write commands from the various host computers over buses 20a, 20b, . . . , 20m, respectively, and delivers the data associated with those commands to the appropriate physical devices 18a, 18b, . . . , 18k, over respective connecting buses 22a, 22b, . . . , 22k. The controller 16 also receives read requests from the host computers 12 over buses 20, and delivers requested data to the host computers 12, either from a cache memory of the controller 16 or, if the data is not available in cache memory, from the physical devices 18. Buses 20 can be operated in accordance with any one of a number of different bus protocols, such as Fibre Channel, SCSI, FICON and ESCON, to name but a few. Likewise, buses 22 can also be operated in accordance with any one of a number of different bus protocols, for example, Fibre Channel, SCSI and Serial ATA, as well as others.

In a typical configuration, the controller 16 also connects to a console PC 24 through a connecting bus 26. Console PC 24 is used for maintenance and access to the controller 16 and can be employed to set parameters of the controller 16 as is well known in the art.

Figure 2:
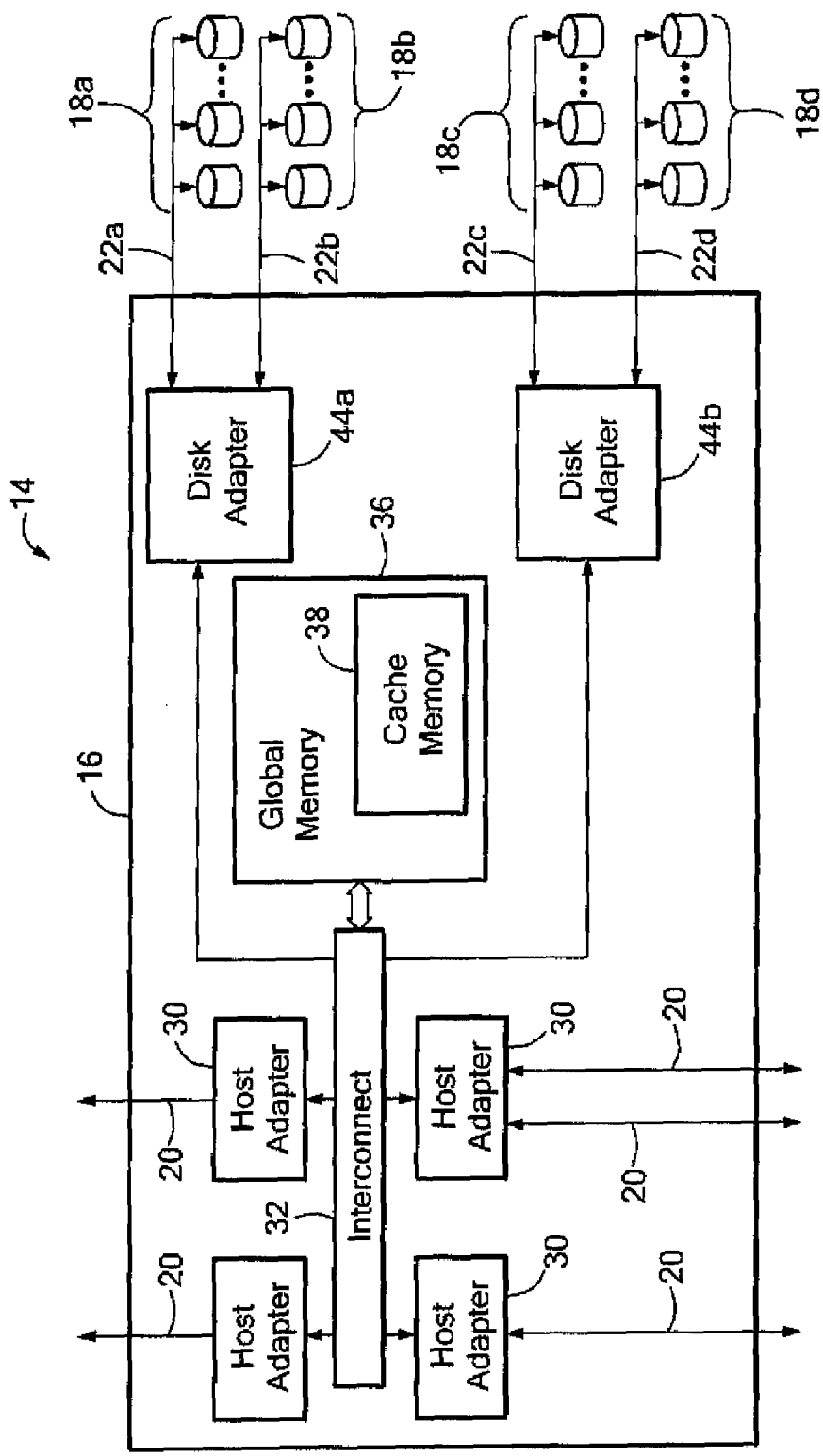
FIG. 2 is a detailed block diagram of the storage controller shown in FIG. 1.

In operation, the host computers 12a, 12b, . . . send, as required by the applications they are running, commands to the data storage system 14 requesting data stored in the logical volumes or providing data to be written to the logical volumes. Referring to FIG. 2, and using the controller in the Symmetrix® data storage system as an illustrative example, details of the internal architecture of the data storage system 14 are shown. The communications from the host computer 12 typically connects to a port of a plurality of host adapters 30 over the bus lines 20. Each host adapter, in turn, connects to a global memory 36 via an interconnect 32. The interconnect can be, for example, a bus structure, a point-to-point interconnect such as a crossbar structure, or any other type of interconnect. The global memory 36 includes a cache memory 38 for storing cached data and control data structures, as will be described. Typically, the control data structures include is a cache index/directory for mapping areas of the disk devices 18 to areas in the cache memory 38.

Also connected to the global memory 36 through the interconnect 32 are device adapters shown as disk adapters 44, which control the physical devices 18 and handle the controller's back-end operations. The host adapters 30 can communicate with the disk adapters 44 through either the global memory 36 or some other messaging scheme. In one embodiment, the disk adapters are installed in controller 16 in pairs. Thus, for simplification, only two disk adapters, indicated as disk adapters 44a and 44b, are shown. However, it will be understood that additional disk adapters may be employed by the system.

Each of the disk adapters 44a, 44b supports multiple bus ports, as shown. For example, the disk adapter (DA) 44a connects to buses 22a and 22b, and DA 44b connects to buses 22c and 22d. Each DA can support additional buses as well. Connected to buses 22a and 22b are a plurality of physical devices (shown as disk drive units) 18a and 18b, respectively. Connected to the buses 22c, 22d are the plurality of physical devices 18c and 18d, respectively. The DAs 44, buses 22 and devices 18 may be configured in such a way as to support redundancy, e.g., the devices 18 on the buses 22 can include both primary and secondary devices.

Still referring to FIG. 2, the cache memory 38 operates as a cache buffer in connection with storage and retrieval operations, in particular caching update information provided by the host adapter 30 during a storage operation and information received from the storage devices 18 which may be retrieved by the host adapter 30 during a retrieval operation.

Figure 3A:
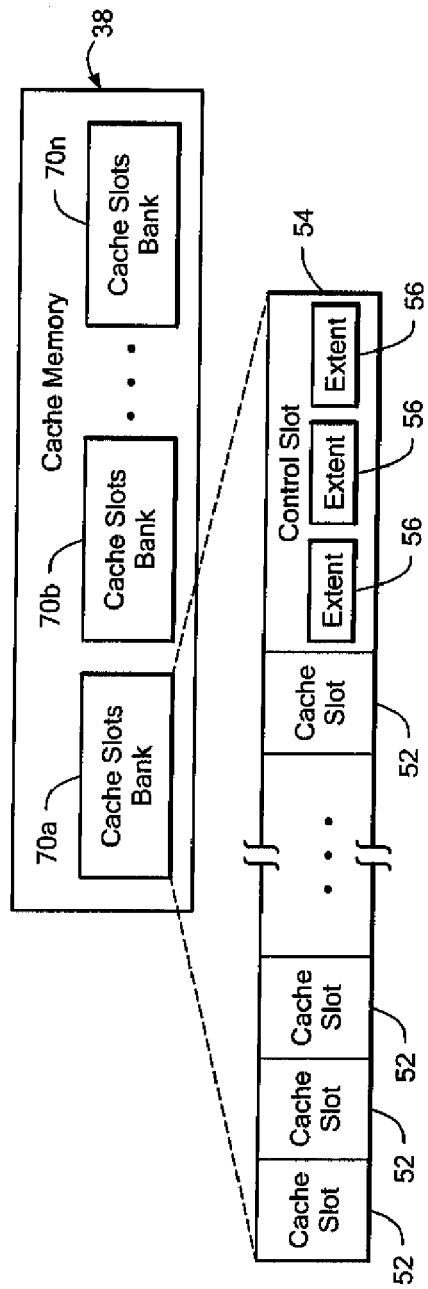
FIG. 3A is a depiction of extents (tables) associated with banks of cache slots in global memory of the storage controller (from FIG. 2).

Referring to FIG. 3A, the cache memory 38 includes a plurality of storage locations, which are organized in a series of cache slots. In the illustrated embodiment, the cache memory 38 includes one or more units of cache referred to as cache slots banks 50, shown as cache slots banks 50a, 50b, . . . , 50n. A cache slots bank is the smallest unit of cache that can be logically disabled. Each bank 50 is divided into one or more cache slots 52, and a control slot 54. The control slot 54, usually much smaller than the cache slots, stores control information associated with the cache slots of the bank to which that control slot belongs. Typically, each cache slot 52 includes a header portion and a data portion that contains information that is cached in the cache slot for a data element, typically a track, with which the cache slot is associated, i.e., a track identified by the header. The header may include such information as slot address, write pending (WP) flag, track ID, pointer and other status and control information.

A cache index/directory operates as an index for the cache slots in the cache memory 38. It includes a cache index table for each of the storage devices 18a, 18b, . . . , 18k, in the data storage system 12. Each cache index table includes device header information, for example, selected identification and status information for the storage device 18 associated with the table. In addition, each cache index table includes cylinder descriptors and each cylinder descriptor includes track descriptors for each track in the cylinder. Each track descriptor includes information for the associated track of the storage device, including whether the track is associated with a cache slot, and, if so, an identification of the cache slot with which the track is associated. Preferably, each track descriptor includes a "cached" flag and a cache slot pointer. The cached flag, if set, indicates that the track associated with the track descriptor is associated with a cache slot. If the cached flag is set, the cache slot pointer points to one of the cache slots, thereby associating the track with the respective cache slot. If the cached flag is set, information from the track is cached in the cache slot identified by the cache slot pointer for retrieval by one or more of the host directors 20. As described above, and referring back to FIGS. 1 and 2, the host adapter 30 typically performs storage (or write) and retrieval (or read) operations in connection with information that has been cached in the cache memory 40, and the disk adapters 44 performs operations to transfer information in the storage devices 18 to the cache memory 38 for buffering ("staging") and to transfer information from the cache memory 38 to the storage devices 18 for storage ("destaging").

Generally, the host adapter 30, during a read operation, attempts to retrieve the information for a particular track from the cache memory 38. However, if the condition of the cached flag associated with that track indicates that the information is not in the cache memory 38 (in other words, a cache miss has occurred), it will enable the disk adapter 44 which controls the storage device 18 that contains the information to retrieve the information from the track which contains it and transfer the information into a cache slot in the cache memory 38. Once the disk adapter 44 has performed this operation, it updates the directory to indicate that the information from the track resides in a cache slot in the cache memory 38, in particular, setting a corresponding cached flag and loading a pointer to the cache slot in the cache slot pointer.

After the disk adapter 44 has stored the data in the cache memory 38, it notifies the host director 30 that the requested data is available. At some point after receiving the notification, the host adapter 30 uses the tables of the directory to identify the appropriate cache slot and retrieves the requested data from that cache slot.

During a write operation, the host adapter 30 determines if information from a track to be written is cached in a cache slot. If cached, the host adapter updates the cache slot with new data. If the host adapter 30 determines that the track is not associated with a cache slot, it selects a cache slot, stores the new data in the selected cache slot and updates the track descriptor. Once the new data is stored in the cache slot, the host adapter 30 notifies the disk adapter 44 so that the disk adapter 44 can write the data cached in the cache slot to the track and storage device with which the cache slot is associated as part of a destaging operation.

As discussed above, a cache index/directory provides an indication of the data, which is stored in the cache memory 38 and provides the addresses of the data stored in the cache memory 38. The cache index/directory can be organized as a hierarchy of tables for devices (logical volumes), cylinders and tracks, as described in Yanai et al., U.S. Pat. No. 5,206,939, and Vishlitzky et al., U.S. Pat. No. 6,049,850, both of which are incorporated herein by reference.

In conventional data storage system controller architectures, the control data structures associated with the cached data in the cache memory 38 might include a cache slots Least Recently Used (LRU) data structure and global memory Write Pending data structures. One global memory write pending data structure would be maintained for each logical volume residing on the data storage system 14. The cache slots LRU data structure would includes a list of cache slots in the cache memory 38, as well as a head pointer to point to the head of the list and a tail pointer to point to the tail of the list. Such a cache slots LRU data structure would be used by the adapters 30, 44 for readily identifying the least-recently-used cache slot or data element in the cache memory 38. The cache slots LRU data structure could be a conventional LRU queue, or a "replacement queue" as described in Vishlitzky et al. U.S. Pat. No. 5,706,467.

Typically, when a host computer 12 writes to or updates a data element in the cache memory 38, the corresponding host adapter 30 updates the cache index/directory as necessary to indicate a write pending in the appropriate tables and, if a write pending is not already indicated, removes the cache slot or slots containing the modified data from the LRU data structure (so that they will not be overwritten before destaging can occur) as necessary. The use of a conventional LRU queue requires many pointer updates and accesses to the global memory 36.

Still referring to FIG. 3A, to reduce the overhead associated with cache slot replacement in the case of cache misses, the control slot 54 in each cache slots bank 50 includes one or more tables (referred to hereinafter as "extents") for cache slot replacement management. Further, the disk adapter 44 is configured to support use of the extents in such a way that reduces global memory access operations (while taking into account the desirability for distribution of slots across different extents).

Figure 3B:
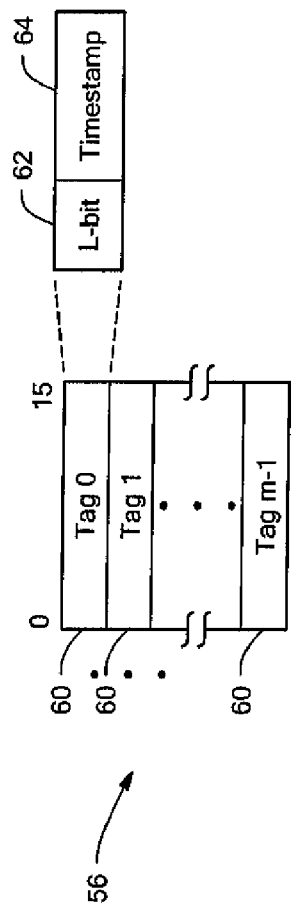
FIG. 3B is a depiction of an exemplary format of the extent (shown in FIG. 3A).

Referring to FIG. 3B, each extent 56 stores a plurality of entries, each entry comprising a tag 60 corresponding to a cache slot 52 in the cache slots bank 50 to which the extent belongs. The tag 60 includes a cache slot protection bit or ("L" bit) 62, which when set indicates that the corresponding cache slot is vulnerable (for example, it is a write pending cache slot), and should not be selected during cache slot replacement for new data. Also included is a timestamp 64 indicating the time of the last cache hit for the data stored in the corresponding cache slot. A tag with a "0" in the timestamp is indicative of invalid or "junk" data (e.g., as might be the case if the tag is associated with a cache slot used by the disk adapter to store scratch data) is the "best candidate" for a new slot. After that special case, the next "best candidate" is a tag in which the "L" bit is "0" and has the oldest timestamp.

The extent 56 thus behaves like a perfect LRU. It can be read in one operation, and requires only one global memory compare/swap for updates (in cases of cache hits and new cache slot assignments). Although the performance of the extent in global memory 36 is superior in many respects to that of conventional LRU data structures, the extent 56 in global memory still requires that the disk adapter 44 perform an external memory access to the global memory 36, which can be a slow operation. To address this problem, as noted earlier, the disk adapter 44 is configured to store a local copy of a requested extent ("local extent" or "locally buffered extent"). Thus, the DA 44, when it requires a new cache slot in response to a host request, copies an extent from global memory into a local buffer. In response to a subsequent request, the DA 44 can determine if the locally buffered extent can be re-used, or if it is necessary to copy the next extent from global memory. The DA 44 also supports various levels of local extent re-usability desired by a user, as will be described.

Figure 4:
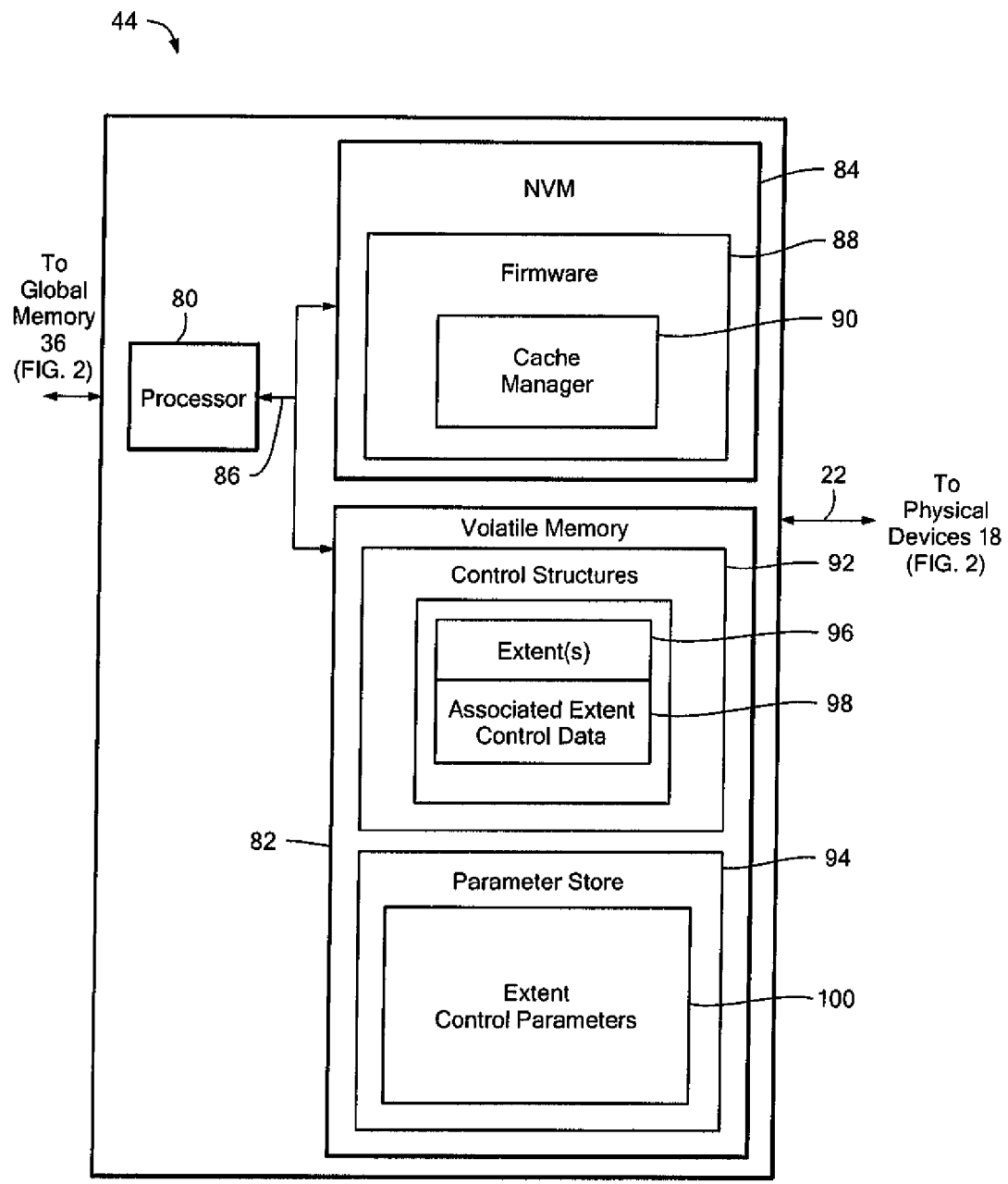
FIG. 4 is a block diagram of the disk adapter (from FIG. 2) having a local memory for storing firmware processes, in particular, a cache manager, a local copy of one or more extents, and other information.

As shown in FIG. 4, the disk adapter 44 includes at least one processor 80 coupled to local memory including a control store 82 and a local, nonvolatile memory (NVM) 84 by an internal bus 86. The processor 80 controls the overall operations of the disk adapter 44 and communications with the memories 82 and 84. The local memory 84 stores firmware (or microcode) 88, including a cache manager 90. The cache manager 90 has routines for accessing cache slots in the global memory 36.

The local volatile memory 82 stores control data structures 92 and parameter data in a parameter store 94. The firmware 88 and parameter store 94 are read each time the data storage system 14 is initialized. The firmware 88 is copied into the control store 82 (or the processor's internal RAM) at initialization for subsequent execution by the processor 80.

During operation, the control data structures 92 will include at least one locally buffered extent 96 as well as associated extent control data 98. The parameters stored in the parameter store 94 include, among other information, extent control parameters 100 which specify conditions under which re-use of a locally buffered extent 96 is permitted. The extent control data 98 is statistical data that is collected for the locally buffered (or local) extent over time and measured against the extent control parameters when the possible re-use of the local extent is considered during a new slot allocation activity. It will be appreciated that more than more than one extent may be buffered locally.

Figure 5A:
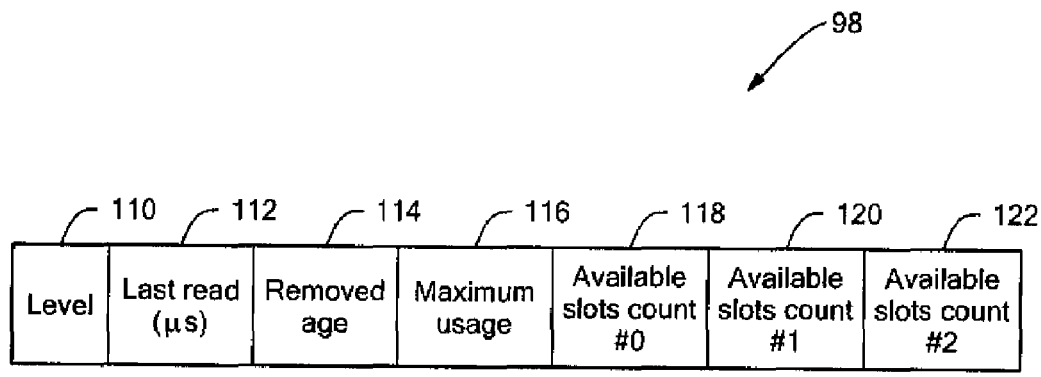
FIG. 5A is an exemplary format of the extent control data structure (from FIG. 4) to store values of extent control data for an associated local extent at a selected level of re-use.

Referring to FIG. 5A, an exemplary format of the extent control data 98 collected in association with a locally buffered extent 96 include the following: an extent re-use level 110; a last read value (in microseconds) 112; a removed age 114; a maximum usage value 116; and available slots counts 118, 120 and 122. The level 110 corresponds to a user-configurable extent re-use level. The last read value 112 indicates the time (in microseconds) since the locally buffered extent was last read. The removed age 114 is the minimum age of the last removed cache slot (expressed in terms of an average fall through time ("ftt") approximation). The maximum usage value 116 provides the number of times the locally buffered extent can be reused. The available slots counts indicate the number of available slots (L-bit not set) in the locally buffered extent the first time it is used 118, the second time it is used 120 (first re-use) and the third time it is used 122 (second re-use), respectively. At level 0, the second re-use is possible only in FBA machines, because CKD extents have only 188 tags.

Figure 5B:
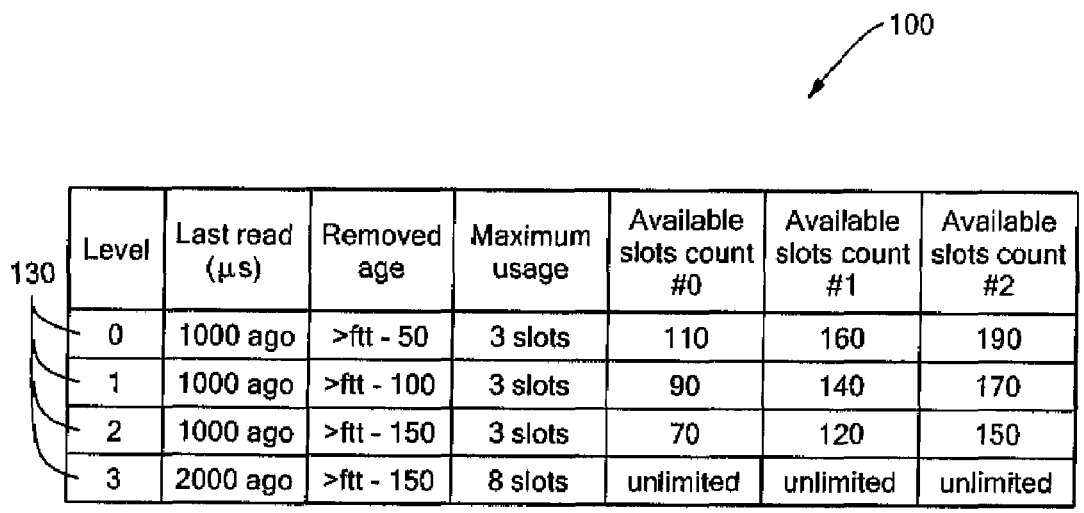
FIG. 5B is a table of exemplary extent control parameters for different levels of local extent re-use.

FIG. 5B shows exemplary parameter values for parameters corresponding to the data shown in FIG. 5A. For example, in the illustrated embodiment, four levels 0 through 3 130 are supports. Level 0, at one end of the range of levels, is the most restrictive, while level 3 at the opposite end is the most relaxed. Level 3 is quite generous about the amount of time since the locally buffered extent was last read, as well as the maximum slot usage, as this level allows up to 8 slots from one extent.

Thus, by configuring the DA 44 for a desired level, a user can optimize performance or adjust the level of re-use of the local extent as appropriate for the type of operation or application to be performed. For example, for usage patterns exhibiting a very low cache hit ratio, it may be desirable to select a level 0 or 1. As well, those levels are likely to be used under circumstances in which the DA has to be selective about which slots to use. On the other hand, a level 3 may be desirable during instances in which caching offers little benefit, for example, during a backup (recovery) process. The use of level 3 during such activity would allow the process to obtain cache slots quickly.

The DAs 44 or even processors 80 in a given DA may be configured differently, that is, with different extent re-use levels and/or other extent control parameters. The values in the table of FIG. 100 are merely an example of possible settings for the different levels to achieve varying degrees of extent re-use. Other parameter values may be chosen. A different number of levels could be used as well.

A user can set the level and adjust any of the associated parameters using a host-based interface or a separate management tool that may reside on the host or some other system that can communicated with the controller 16. In addition, the settings can be set or modified via an in-line interface of PC 24. Any of these types of interfaces would allow a system call to be made to the controller 16 to change the extent control parameters. Although not shown, a user has the capability to disable the feature as well.

Figure 6:
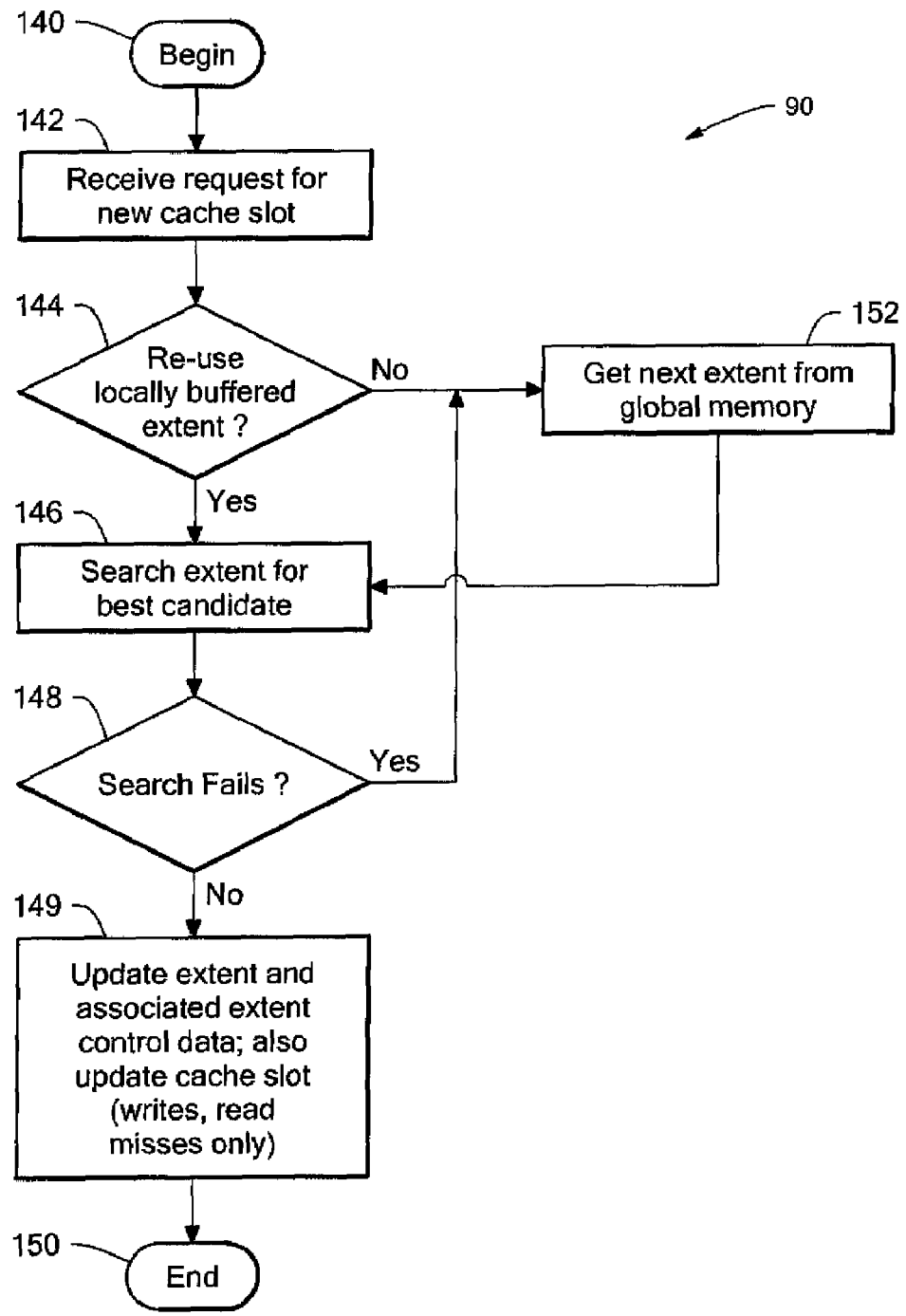
FIG. 6 is a flow diagram depicting a cache slot replacement process of the cache manager.

Referring to FIG. 6, an exemplary operation of the cache manager (or process) 90 with local extent use/re-use control is shown. The process 90 begins (step 140) with a request for a new cache slot (step 142). Thus, the process 90 needs to perform an extent lookup to find a cache slot to be used. The process 90 first determines if the re-use of a locally buffered extent is an option (step 144). If it is, the process 90 examines a locally buffered extent to find a best candidate for slot replacement (step 146). If the search for a best candidate is successful (at step 148), the process 90 updates the extent and associated extent control data (as well as updates the corresponding global memory extent and cache slots in the case of new writes and read misses)(step 149), and then terminates (step 150) upon completion of extent access and compare/swap activities.

The search may be unsuccessful. For example, all of the tags in the extent may indicate vulnerable slots (such as write pending slots), or there may be a mismatch between the selected "best candidate" tag in local memory and global memory (which would be the case if another DA had updated the tag since the extent was copied to local memory). If it is determined that the search failed (at step 148), or it is determined at step 144 that the local extent cannot be re-used, the process 90 copies the next extent from global memory into the local memory (step 152) and proceeds to the step of searching the local copy of the extent for a best candidate.

Figure 7:
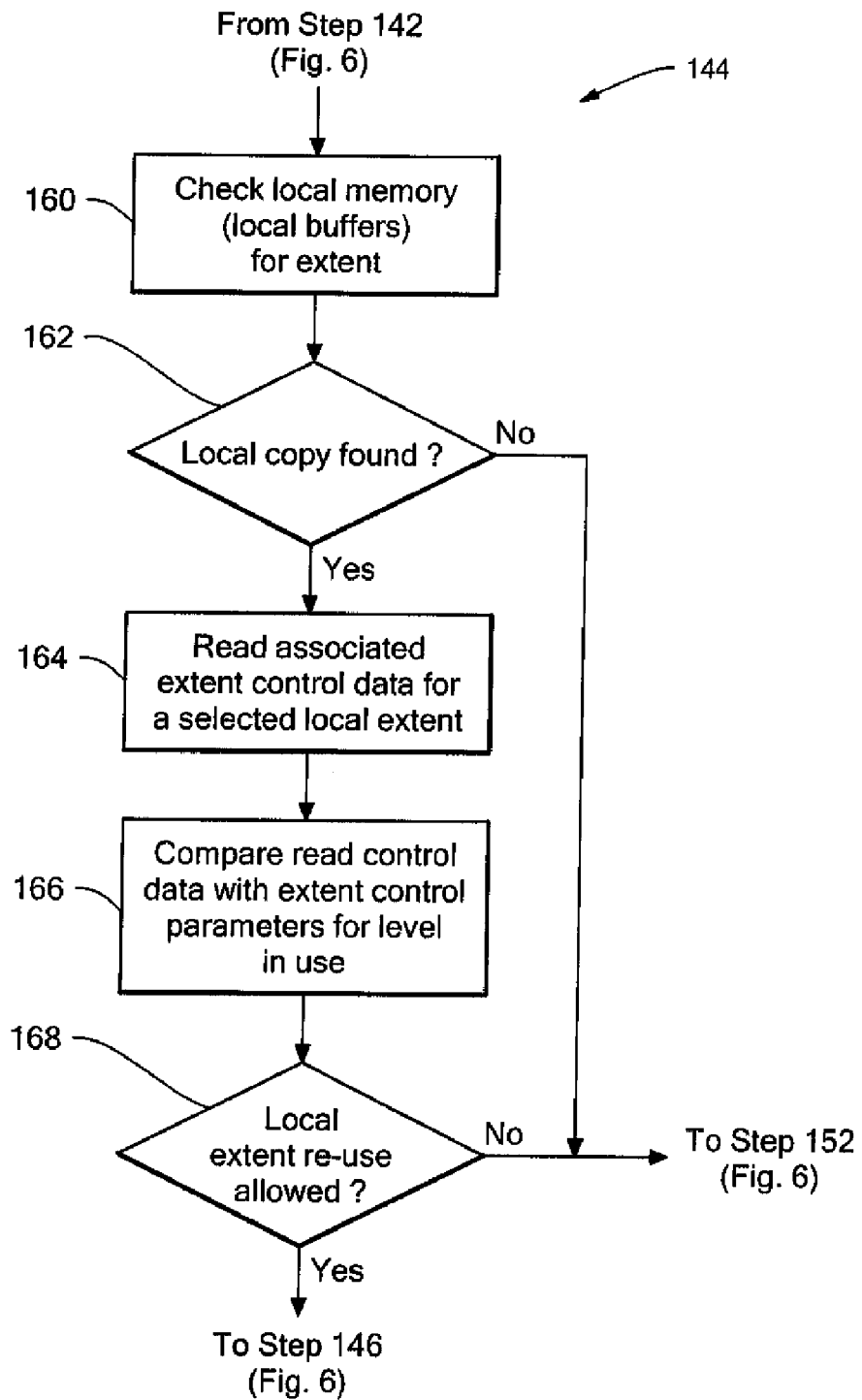
FIG. 7 is a flow diagram depicting operation of a local extent re-use determination portion of the cache slot replacement process.

Referring now to FIG. 7, details of the local extent re-use determination 144 are shown. To determine if a local extent can be used during the current slot allocation, the process 90 checks the local buffer(s) in the local memory for an extent (step 160). If a local copy of an extent is not found (step 162), the process 90 proceeds to step 152 (FIG. 6). If a locally buffered extent is available, the process 90 reads the associated extent control data for that extent (step 164) and compares the data with the extent control parameters for the "re-use" level in use (step 166). The results are used to determine if re-use of the local extent is allowed (step 168). If re-use is allowed, the process 90 proceeds to step 146 (FIG. 6) to search for the best candidate (for slot replacement) and perform the update activities of step 149 if the search yields a best candidate. Otherwise, if extent re-use is not allowed for the selected extent, the process 90 may access another locally buffered extent (and thus repeat step 144), or return to step 152 (FIG. 6) to obtain the next extent from global memory.

Various techniques can be employed in copying an extent from global memory to local memory (for step 152 above). In one embodiment, as will be described with reference to FIG. 8, the DA 44 can use an automatic DMA ("auto-DMA") mechanism 170 to copy extents from global memory to local memory. Typically, in a DA embodiment in which multiple processors 80 are available, one of the processors is dedicated to accessing global memory and executes the auto-DMA process. The auto-DMA process 170 assumes the availability of at least one additional local buffer in the DA 44.

The auto-DMA mechanism maintains various control information to distinguish between a current buffer that has been filled by the last auto-DMA operation and may be ready for use, and the other buffer (in the case of two buffers) that is being filled by a current auto-DMA operation for future use. An "actual hand" points to the current extent (for, example, using a value corresponding to the control slot pointer plus an index or offset value of the extent) stored in the current buffer. A "predicted hand" is used to indicate (or predict) the next extent to be used, that is, once the current auto-DMA operation is completed. Also maintained in association with each auto-DMA operation is a stamp which includes a time stamp, including a macro-timer value and a micro-timer value, as well as a unique identifier (ID) of the request.

Figure 8:
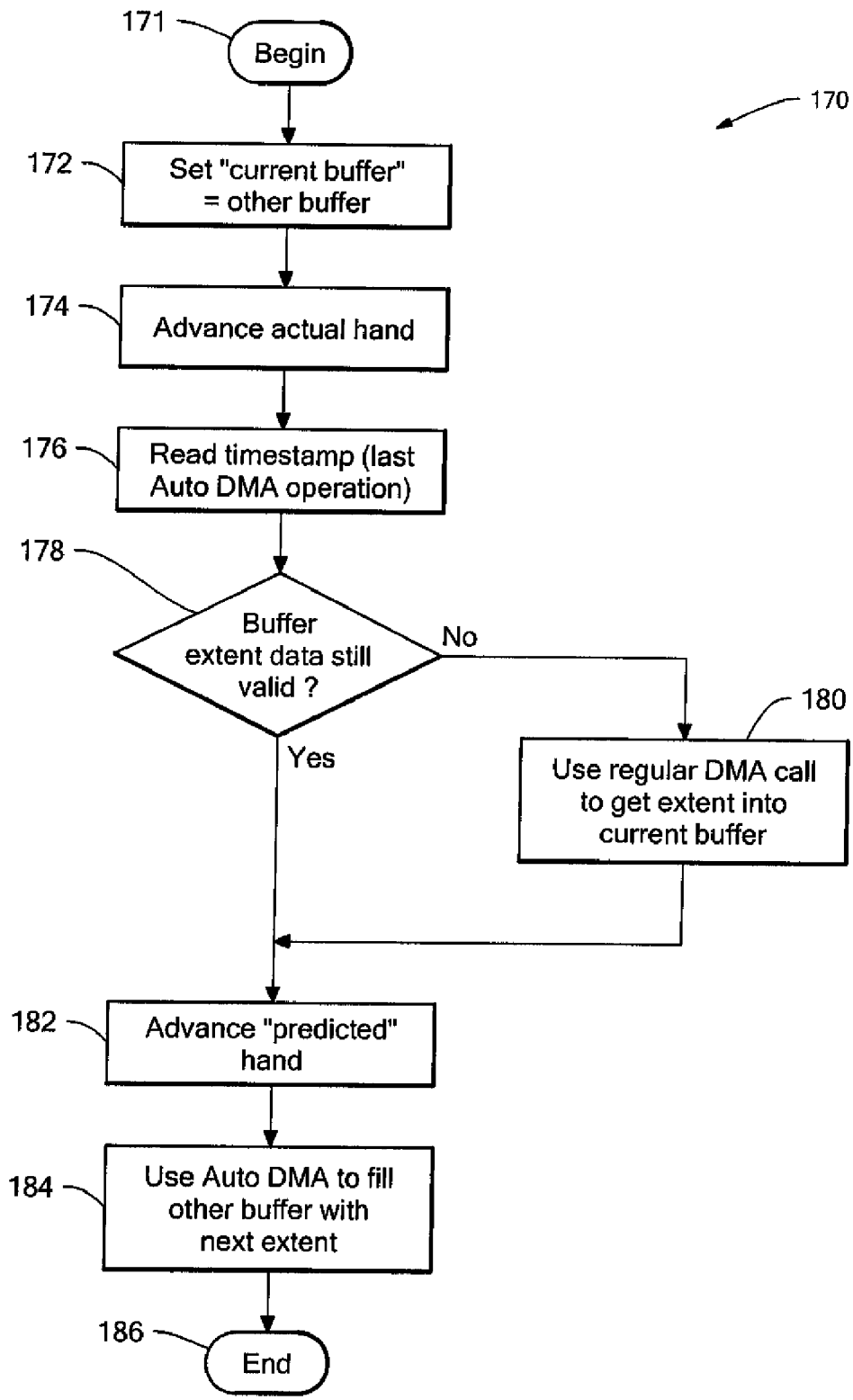
FIG. 8 is a flow diagram depicting an automatic DMA mechanism to access an extent in the global memory.

Referring now to FIG. 8, the process begins (step 171) with a DA processor auto-DMA request. Once a request is received, the process 170 sets a "current buffer" pointer to the other buffer (step 172) and advances the actual hand (step 174) to the next extent. The process determines if the buffer data is still valid, first by checking the stamp to determine if the last auto-DMA operation was recent enough (for example, was the macro-timer value within a timeframe, such as a 0.5 s window, and was the micro-timer within a finer window of, say, 10 or 100 ms). If the auto-DMA operation that stored the extent data in the current buffer was not recent enough, and the process determines that the extent data in the current buffer cannot be considered valid, a call is made to copy the extent from global memory into the current buffer. Typically, this call is made to the requesting DA processor's own DMA routine. Meanwhile, the auto-DMA process advances the predicted hand to the next extent (step 182) and uses an auto-DMA call to fill the other local buffer with the data in the next extent in global memory (step 184). Once the auto-DMA is completed, the process terminates (step 186).

It is to be understood that while the invention has been described in conjunction with the detailed description thereof, the foregoing description is intended to illustrate and not limit the scope of the invention, which is defined by the scope of the appended claims. Other embodiments are within the scope of the following claims. All publications and references cited herein are expressly incorporated herein by reference in their entirety.

What is claimed is:

1. A method of cache management in a data storage system comprising:
   providing a table comprising tags corresponding to cache slots in a cache memory;
   storing a copy of the table in a local buffer in response to a request for allocation of one of the cache slots;
   using the locally buffered table to make the requested cache slot allocation; and
   using a set of control parameters associated with the locally buffered table to determine if the locally buffered table can be used for cache slot allocation in response to a subsequent request.

2. The method of claim 1 further comprising:
   providing user-selectable levels to control the degree of locally buffered table re-use, the user-selectable levels determining which values of the control parameters are used.

3. The method of claim 2 further comprising:
receiving a selection of one of the user-selectable levels by a user.

4. The method of claim 3 further comprising:
using the selected level to determine if one of the cache slots corresponding to tags in the locally buffered table can be used to store new data.

5. The method of claim 4 wherein using comprises:
comparing statistics associated with the tags in the locally buffered table to the control parameters.

6. The method of claim 5 wherein the control parameters include an indication of when the locally buffered table was last written.

7. The method of claim 5 wherein the tags in the table each include a flag which, if set, indicates if a corresponding one of the slots is available for use.

8. The method of claim 7 wherein the control parameters include a number of the tags in which the flag is set.

9. The method of claim 5 wherein the tags in the locally buffered table each include a timestamp indicating the time that the most recent hit occurred.

10. The method of claim 1 wherein the user-selectable levels include a range of locally buffered table re-use levels from most restrictive to least restrictive.

11. An apparatus, comprising:
a stored computer program in a computer readable memory, which program when executed by a computer institutes the steps of;
providing a table comprising tags corresponding to cache slots in a cache memory;
storing a copy of the table in a local buffer in response to a request for allocation of one of the cache slots;
using the locally buffered table to make the requested cache slot allocation; and
using a set of control parameters associated with the locally buffered table to determine if the locally buffered table for cache slot allocation in response to a subsequent request.

12. A data storage system comprising:
a plurality of physical resources;
a global memory comprising a cache memory, which includes cache slots to store data associated with tracks on the physical resources, and at least one table having tags corresponding to the cache slots;
a processor for managing writes to and reads from the plurality of physical resources using a locally buffered copy of the at least one table; and
wherein the processor is operable to associate control parameters with the locally buffered copy of the at least one table and is responsive to user-selectable levels to control a degree of re-use, the user-selectable levels determining which values of control parameters are used.

* * * * *

UNITED STATES PATENT AND TRADEMARK OFFICE
CERTIFICATE OF CORRECTION

PATENT NO. : 7,089,357 B1  Page 1 of 1
APPLICATION NO. : 10/667564
DATED : August 8, 2006
INVENTOR(S) : Ezra It is certified that error appears in the above-identified patent and that said Letters Patent is hereby corrected as shown below:

Column 3, line 6 delete "include is a" and replace with --include a--.

Column 4, line 65 delete "would includes" and replace with --includes--.

Column 6, lines 21-22 delete "that more than more than one" and replace with --that more than one--.

Column 8, lines 9-10 delete "(for, example," and replace with --(for example,--.

Column 10, line 9 delete "table for" and replace with --table can be used for--.

Signed and Sealed this

Nineteenth Day of December, 2006

JON W. DUDAS
*Director of the United States Patent and Trademark Office*